US012633279B2

(12) United States Patent
Ueno

(10) Patent No.: US 12,633,279 B2
(45) Date of Patent: May 19, 2026

(54) ACTIVE NOISE REDUCTION DEVICE, MOBILE OBJECT, AND ACTIVE NOISE REDUCING METHOD

(71) Applicant: Panasonic Automotive Systems Co., Ltd., Kanagawa (JP)

(72) Inventor: Shotaro Ueno, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 164 days.

(21) Appl. No.: 18/658,658

(22) Filed: May 8, 2024

(65) Prior Publication Data

US 2024/0386873 A1 Nov. 21, 2024

(30) Foreign Application Priority Data

May 17, 2023 (JP) ................................ 2023-081702

(51) Int. Cl.
*G10K 11/16* (2006.01)
*G10K 11/178* (2006.01)

(52) U.S. Cl.
CPC .. *G10K 11/17823* (2018.01); *G10K 11/17825* (2018.01); *G10K 11/17883* (2018.01); *G10K 2210/1282* (2013.01); *G10K 2210/3011* (2013.01); *G10K 2210/3026* (2013.01); *G10K 2210/3027* (2013.01); *G10K 2210/3028* (2013.01); *G10K 2210/3056* (2013.01)

(58) Field of Classification Search
CPC ....... G10K 11/17823; G10K 11/17825; G10K 11/17883; G10K 2210/1282; G10K 2210/3011; G10K 2210/3026; G10K 2210/3027; G10K 2210/3028; G10K 2210/3056
USPC .................................... 381/71.4, 71.1, 71.43
See application file for complete search history.

(56) References Cited

U.S. PATENT DOCUMENTS

2004/0247137 A1 12/2004 Inoue et al.
2008/0192948 A1 8/2008 Kan et al.
2011/0280410 A1 11/2011 Matono et al.
2017/0294180 A1 10/2017 Hiraga et al.
(Continued)

FOREIGN PATENT DOCUMENTS

JP 2004-361721 12/2004
JP 2006-036061 2/2006
(Continued)

*Primary Examiner* — Ammar T Hamid
(74) *Attorney, Agent, or Firm* — GREENBLUM & BERNSTEIN, P.L.C.

(57) ABSTRACT

An active noise reduction device includes a reference-signal generator that generates a first reference signal having a first frequency that corresponds to the engine speed of an engine, an adaptive filter that outputs a cancellation signal used to output cancellation sound by applying a filter factor to the first reference signal, the filter factor being successively updated based on an error signal output from a microphone, and a frequency controller that, when the amount of variation in the engine speed of engine has been determined to exceed a predetermined value, causes the reference-signal generator to generate a second reference signal having a second frequency and then to cause the adaptive filter to output a cancellation signal based on the second reference signal, the second frequency being obtained by correcting the first frequency.

11 Claims, 13 Drawing Sheets

(56) References Cited

U.S. PATENT DOCUMENTS

| | | | | |
|---|---|---|---|---|
| 2018/0240452 | A1 | 8/2018 | Every | |
| 2022/0208167 | A1* | 6/2022 | Aval | G10K 11/178 |

FOREIGN PATENT DOCUMENTS

| | | |
|---|---|---|
| JP | 2010-167844 | 8/2010 |
| WO | 2017/006547 | 1/2017 |

* cited by examiner

ACTIVE NOISE REDUCTION DEVICE, MOBILE OBJECT, AND ACTIVE NOISE REDUCING METHOD

CROSS REFERENCE TO RELATED APPLICATION

The present application is based on and claims priority of Japanese Patent Application No. 2023-081702 filed on May 17, 2023.

FIELD

The present disclosure relates to an active noise reduction device or the like for actively reducing noise.

BACKGROUND

Patent Literature (PTL) 1 discloses an active noise reduction device that prevents a user from hearing unusual sound output from an adaptive notch filter even if an abrupt change has occurred in engine pulse.

CITATION LIST

Patent Literature

PTL 1: Japanese Unexamined Patent Application Publication No. 2006-036061

SUMMARY

The present disclosure provides an active noise reduction device that can be improved upon.

An active noise reduction device according to one aspect of the present disclosure is an active noise reduction device for reducing noise caused by revolution of a power source provided in a mobile object by outputting cancellation sound from a loudspeaker in a space of the mobile object in which the loudspeaker and a microphone are installed. The active noise reduction device includes a reference-signal generator that generates a first reference signal having a first frequency that corresponds to an engine speed of the power source; an adaptive filter that outputs a cancellation signal used to output the cancellation sound by applying a filter factor to the first reference signal, the filter factor being successively updated based on an error signal output from the microphone, and a frequency controller that, when an amount of variation in the engine speed of the power source has been determined to exceed a predetermined value, causes the reference-signal generator to generate a second reference signal having a second frequency and then to cause the adaptive filter to output a cancellation signal based on the second reference signal, the second frequency being obtained by correcting the first frequency.

The active noise reduction device according to one aspect of the present disclosure can be improved upon.

These and other advantages and features of the present disclosure will become apparent from the following description thereof taken in conjunction with the accompanying drawings that illustrate a specific embodiment of the present disclosure.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

An embodiment will be described hereinafter in greater detail with reference to the accompanying drawings. The embodiment described below shows a general or specific example. Numerical values, shapes, materials, constituent elements, positions in the layout of constituent elements and connection forms of the constituent elements, steps, a sequence of steps, and so on shown in the following embodiment are mere examples and do not intend to limit the scope of the present disclosure. Among constituent elements in the following exemplary embodiment, those that are not recited in any independent claim are described as optional constituent elements.

Note that each drawing is a schematic diagram and does not necessarily provide precise depiction. Substantially the same constituent elements are given the same reference signs throughout the drawings, and their detailed description may be omitted or simplified.

EMBODIMENT (Underlying Knowledge Forming Basis of the Present Disclosure)

In order to reduce narrow-band noise that may be caused in the cabin of a vehicle such as an automobile, active noise reduction devices using an adaptive filter capable of reducing single-frequency noise have become commercially practical. However, there is a problem with the active noise reduction devices that it is difficult to achieve satisfactory noise reduction if the frequency of noise is shifted by 1 Hz from an assumed frequency of noise.

To address this problem, the following embodiment describes an active noise reduction device that achieves improved noise reducing performance by using the SAN filtered-x LMS algorithm as a basis. Note that SAN is an abbreviation of a single-frequency adaptive notch filter and LMS is an abbreviation of a least mean square.

[Noise Signal Reducing Method Using SAN Algorithm]

Before the description of the active noise reduction device according to the embodiment, a noise signal reducing method using the SAN algorithm and a noise reducing method using the SAN filtered-x LMS algorithm will be described.

Figure 1:
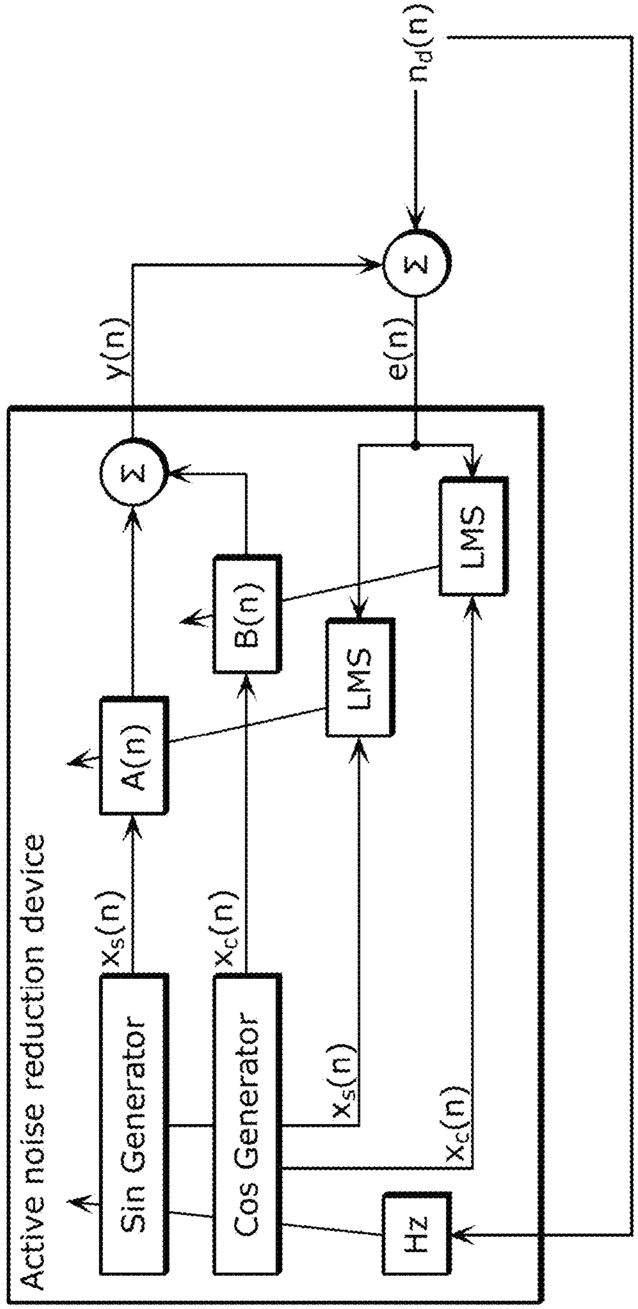
FIG. 1 is a block diagram showing a functional configuration of an active noise reduction device that conforms to an SAN algorithm.
Figure 2:
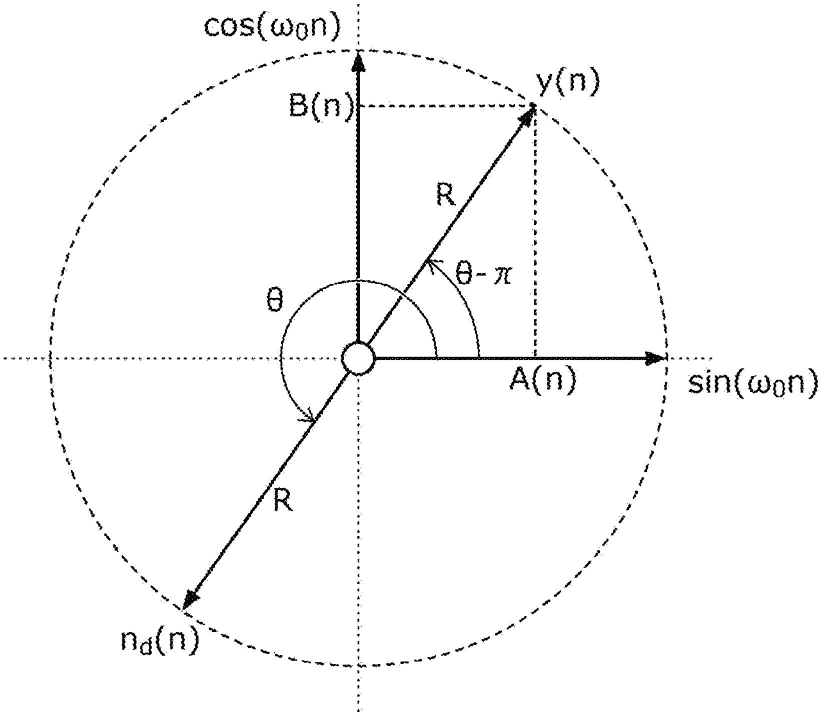
FIG. 2 is a diagram showing the relationship between a noise signal and a cancellation signal in the SAN algorithm.

First, the noise signal reducing method using the SAN algorithm will be described. FIG. 1 is a block diagram showing a functional configuration of an active noise reduction device that conforms to the SAN algorithm. FIG. 2 is a diagram showing the relationship between a noise signal (a sinusoidal signal of noise) and a cancellation signal according to the SAN algorithm. In the following description of the noise signal reducing method using the SAN algorithm, the noise signal is regarded as a single-frequency sinusoidal signal.

In FIGS. 1 and 2, n is an integer greater than or equal to 0 and indicates the sampling number in a discrete time system. When the frequency of the noise signal to be reduced is given as $f_0$ [Hz], the normalized angular frequency $\omega_0$[rad] is expressed by [Math. 1] given below.

$$\omega_0 = 2\pi f_0 T_s = 2\pi f_0 / f_s \quad \text{[Math. 1]}$$

In [Math. 1], $T_s$ [sec] is the sampling period, and $f_s$ [Hz] is the sampling frequency. Using normalized angular frequency $\omega_0$, $nT_s$ that represents the discrete time is expressed by n.

Using normalized angular frequency $\omega_0$, amplitude R, and phase θ [rad], sinusoidal signal $n_d(n)$ of noise is expressed by [Math. 2] given below.

$$n_d(n) = R\sin(\omega_0 n + \theta) \quad \text{[Math. 2]}$$

The cancellation signal is generated in order to reduce $n_d$ (n). Since cancellation signal y(n) and $n_d$ (n) are the same in amplitude and opposite in phase, cancellation signal y(n) is expressed by [Math. 3] given below.

$$y(n) = R\sin\{\omega_0 n + (\theta - \pi)\} = A(n)\sin(\omega_0 n) + B(n)\cos(\omega_0 n) \quad \text{[Math. 3]}$$

A(n) and B(n) are filter factors of the adaptive filter. Amplitude R of cancellation signal y (n) is expressed by the square root of $A(n)^2+B(n)^2$, and phase (θ−n) is expressed by the arctangent of B(n)/A(n). Thus, the amplitude of the cancellation signal can be changed by changing the amplitudes of filter factors A(n) and B(n) of the adaptive filter, and the phase of the cancellation signal can be changed by changing the ratio of filter factors A(n) and B(n) of the adaptive filter.

Here, filter factors A(n) and B(n) of the adaptive filter are optimized so as to minimize e(n) in accordance with the LMS algorithm, where e(n) is the error signal caused by interference of the noise signal and the cancellation signal. In this way, the noise signal is reduced.

[Noise Reducing Method Using SAN filtered-x LMS Algorithm]

Figure 3:
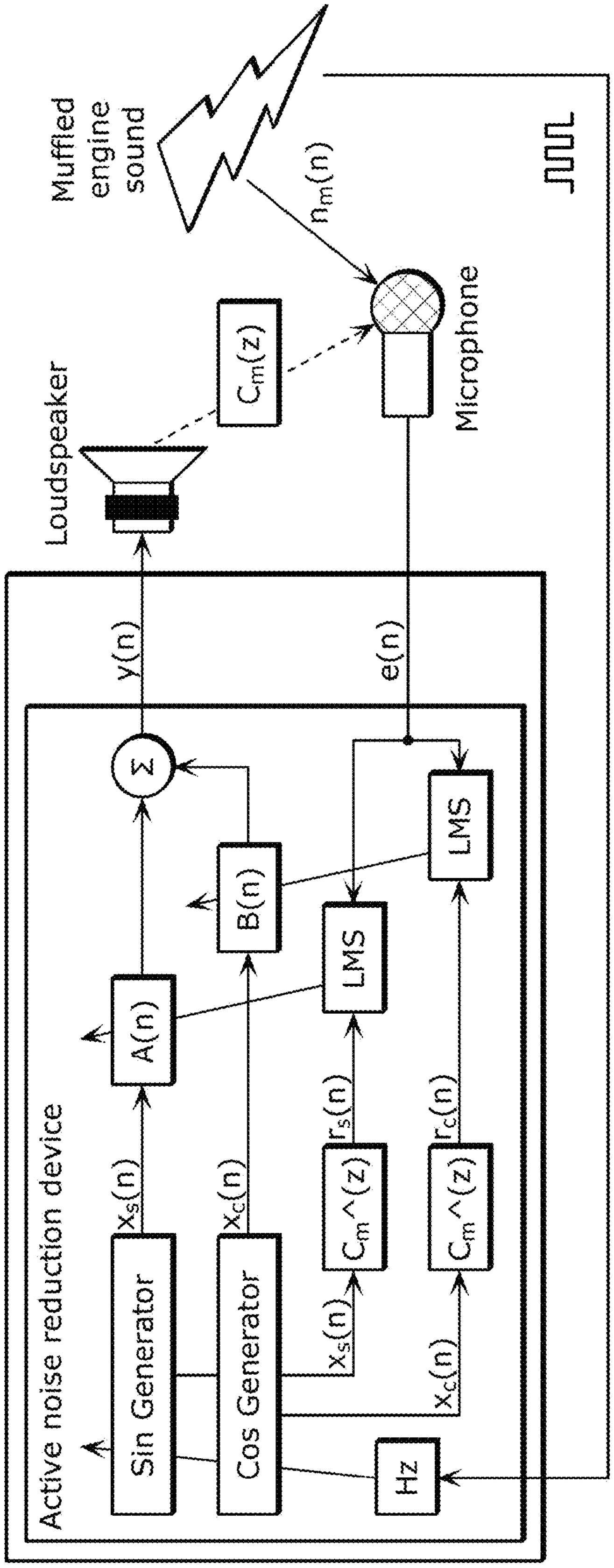
FIG. 3 is a block diagram showing a functional configuration of an active noise reduction device that conforms to an SAN filtered-x LMS algorithm.
Figure 4:
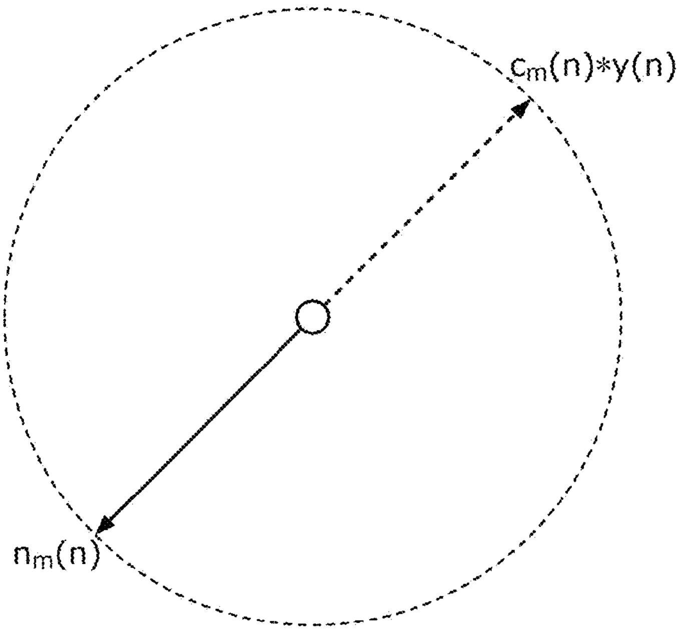
FIG. 4 is a diagram showing the relationship between noise and cancellation sound in the SAN filtered-x LMS algorithm.

Next, the noise reducing method using the SAN filtered-x LMS algorithm will be described. FIG. 3 is a block diagram showing a functional configuration of an active noise reduction device that conforms to the SAN filtered-x LMS algorithm. FIG. 4 is a diagram showing the relationship between noise and cancellation sound according to the SAN filtered-x LMS algorithm. In the following description of the noise reducing method using the SAN filtered-x LMS algorithm, noise is regarded as muffled engine sound. The muffled engine sound is noise that is instantaneously approximate to a single-frequency sinusoidal wave.

The cancellation signal propagates through a loudspeaker, the space in the vehicle interior, and a microphone and is input to the active noise reduction device. This transduction pathway is expressed by acoustic transfer function $C_m(z)$, where z means z-transform. The SAN filtered-x LMS algorithm is the algorithm that is based on the above-described SAN algorithm and further takes into account acoustic transfer function $C_m(z)$.

In FIGS. 3 and 4, simulated transfer function $C_m(z)$ is the transfer function (filter) that simulates acoustic transfer function $C_m(z)$. Here, $n_m(n)$ is the muffled engine sound at the position of the microphone having frequency $f_0$ [Hz], and $c_m(n)$ is the impulse response in discrete time n of $C_m(z)$. Moreover, $c_m(n)*y(n)$ represents the cancellation sound at the position of the microphone, and * means the convolution operator. Although in the case of actually reducing the muffled engine sound, convolution is integration in continuous time, the following description is given assuming that convolution is the product-sum operation in discrete time.

In the noise reducing method based on the SAN filtered-x LMS algorithm, processing from (1) to (5) described below is repeatedly executed so that filter factors A(n) and B(n) converge to optimum values.

(1) Frequency $f_0$ [Hz] of the muffled engine sound from engine $n_m(n)$ is detected based on a signal indicating the rotational frequency of engine.

(2) Sinusoidal wave $x_s(n)$ and cosine wave $x_c(n)$ that have a frequency of $f_0$ [Hz] are generated, multiplied respectively by factors A(n) and B(n), and then added together to generate cancellation signal y(n) expressed by [Math. 4].

$$y(n) = A(n)x_s(n) + B(n)x_c(n) \quad \text{[Math. 4]}$$

(3) Cancellation sound is output from the loudspeaker in accordance with cancellation signal y(n). At the position of the microphone, residual sound (error signal) e(n) caused by interference of cancellation sound $C_m(n)*y(n)$ and muffled engine sound $n_m(n)$ is detected by the microphone.

(4) Sinusoidal wave $x_s(n)$ and cosine wave $x_c(n)$ are filtered by $C_m\hat{}(z)$ to generate sinusoidal wave $r_s(n)$ and cosine wave $r_c(n)$, respectively.

(5) Filter factors A(n) and B(n) are updated on the basis of formulas for updating the LMS expressed by [Math. 5] and [Math. 6], where μ is the step-size parameter that determines the amount of updating (the rate of updating) of filter factors A(n) and B(n) per sampling unit.

$$A(n+1)=A(n)-\mu r_s(n)e(n) \quad \text{[Math. 5]}$$

$$B(n+1)=B(n)-\mu r_c(n)e(n) \quad \text{[Math. 6]}$$

Here, additional information is provided for the muffled engine sound. The muffled engine sound is noise that is generated in the space in the vehicle interior when vibrations and exhaust noise caused by explosion in the process of aspiration of air, compression, explosion, and exhaust propagate through the chassis or the like of the vehicle. For example, in the case of a four-cylinder four-cycle engine, two revolutions of the shaft cause explosions in all of the four cylinders, and two explosions occur per revolution. This produces noise having a frequency component that is double the engine revolutions per minute. This noise is called, for example, secondary muffled sound (secondary component) of engine revolutions and may pose a problem because the noise level of the secondary component is higher than the noise levels of the other components. Not only the secondary component but also a harmonic component may also pose a problem.

In the case of a six-cylinder engine, a tertiary component has a high noise level, and in the case of a three-cylinder engine, a 1.5-order component has a high noise level. That is, if the number of cylinders in the engine is reduced by downsizing, the muffled engine sound has a lower dominant frequency.

[Configuration of Active Noise Reduction Device]

Figure 5:
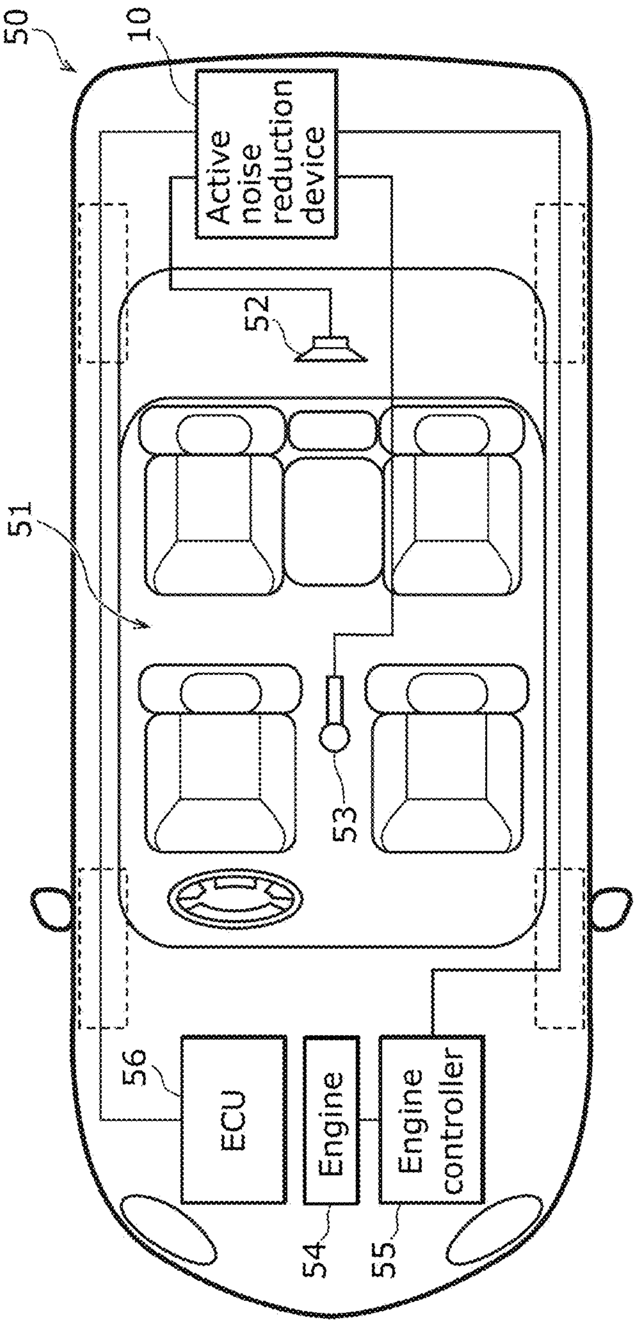
FIG. 5 is a schematic diagram of a vehicle that includes the active noise reduction device according to an embodiment.
Figure 6:
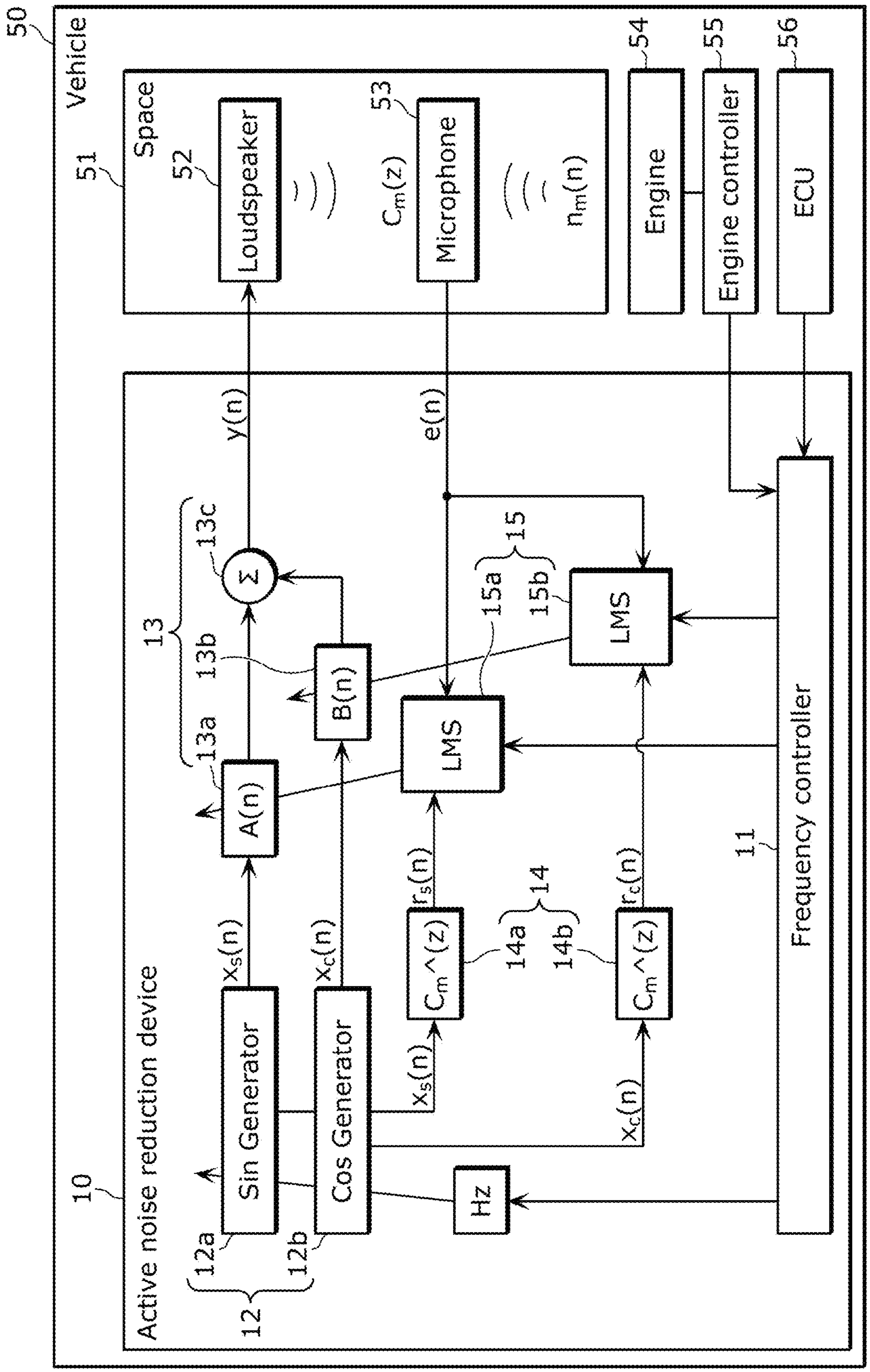
FIG. 6 is a block diagram showing a functional configuration of the active noise reduction device according to the embodiment.

Next, the configuration of the active noise reduction device according to the embodiment will be described. FIG. 5 is a schematic diagram of a vehicle that includes the active noise reduction device according to the embodiment. FIG. 6 is a block diagram showing a functional configuration of the active noise reduction device according to the embodiment.

As shown in FIG. 5, active noise reduction device 10 is mounted on vehicle 50 to reduce noise in space 51 in the vehicle interior. Vehicle 50 may be a gasoline-powered vehicle or a hybrid vehicle. Examples of the hybrid vehicle as used herein include series-, parallel-, and split-system hybrid vehicles. The examples of the hybrid vehicle as used herein also include a plug-in hybrid vehicle.

Loudspeaker 52 and microphone 53 are provided in space 51. To simplify the description, only one set of loudspeaker 52 and microphone 53 is shown in FIGS. 5 and 6, but in actuality, a plurality of sets of loudspeakers 52 and microphones 53 are provided in space 51, and a plurality of sets of loudspeakers 52 and microphones 53 are used to reduce noise.

Vehicle 50 further includes engine 54, engine controller 55, and electronic control unit (ECU) 56.

Engine 54 is a drive that serves as a power source of vehicle 50 and a source of noise in space 51. For example, engine 54 may be arranged in a space different from space 51. Specifically, engine 54 is arranged in a space formed in the bonnet of vehicle 50.

Engine controller 55 controls (drives) engine 54 in accordance with, for example, the driver's operation for accelerating vehicle 50. Engine controller 55 also outputs a pulse signal (engine pulse signal) responsive to the engine speed (frequency) of engine 54 to active noise reduction device 10. For example, the frequency of the pulse signal may be proportional to the engine speed (frequency) of engine 54. The pulse signal is specifically an analog signal such as a so-called tach pulse.

ECU 56 is a computer that performs electronic control of vehicle 50. The ECU outputs a digital signal that indicates the engine speed (frequency) of engine 54 to active noise reduction device 10. ECU 56 also outputs, to active noise reduction device 10, signals such as an ignition signal indicating ignition, a signal indicating the degree of acceleration opening, a signal indicating vehicle speed, a signal indicating an engine's torque, a signal indicating the gear status of vehicle 50, and a signal indicating the acceleration of vehicle 50. ECU 56 also outputs, to active noise reduction device 10, signals such as a signal indicating the open/closed state of the windows of vehicle 50, a signal indicating the open/closed state of the doors of vehicle 50, a signal indicating the volume of air from an air conditioner provided in vehicle 50, a signal indicating the temperature inside vehicle 50 (the temperature inside space 51), and a signal indicating the temperature outside vehicle 50.

Note that ECU 56 and active noise reduction device 10 communicate with each other via a controller area network (CAN).

Active noise reduction device 10 is an active-type noise reduction device that reduces noise at the installation position of microphone 53 by cancellation sound output from loudspeaker 52. For example, active noise reduction device 10 may be achieved by a microprocessor such as a microcontroller or a digital signal processor (DSP) and a storage (memory).

As shown in FIG. 6, active noise reduction device 10 specifically includes frequency controller 11, reference-signal generator 12, adaptive filter 13, corrector 14, and updater 15. Reference-signal generator 12 includes sinusoidal-wave generator 12*a* and cosine-wave generator 12*b*, and adaptive filter 13 includes adaptive filters 13*a* and 13*b* and adder 13*c*. Corrector 14 includes correctors 14*a* and 14*b*, and updater 15 includes updaters 15*a* and 15*b*. Functions of these constituent elements may be achieved by, for example, causing the microprocessor such as the DSP to execute a computer program stored in the storage.

Frequency controller 11 acquires a signal that indicates the engine speed of engine 54 (an analog signal output from engine controller 55 or a digital signal that is output from ECU 56) and detects (calculates) the (instantaneous) frequency of the muffled engine sound in accordance with the acquired signal. The relationship of frequency $f_0$ [Hz] of the muffled engine sound, engine speed RPM [rpm], and order ORD of the muffled engine sound is expressed by [Math. 7] given below. In other words, [Math. 7] is the formula for detecting a first frequency that corresponds to the engine speed.

$$f_0=(RPM)(ORD)/60 \quad \text{[Math. 7]}$$

When an abrupt variation has been determined to occur in the engine speed of engine 54, frequency controller 11 also performs signal processing for improving noise reducing performance. This signal processing uses various signals provided from engine controller 55 and ECU 56. The details of this signal processing will be described later.

Sinusoidal-wave generator 12$a$ outputs a sinusoidal wave of the frequency detected by frequency controller 11 as reference signal $x_s(n)$, where n is an integer greater than or equal to 0 and indicates the sampling number in the discrete-time system. Reference signal $x_s(n)$ is output to adaptive filter 13$a$, corrector 14$a$, and updater 15$a$.

Cosine-wave generator 12$b$ outputs a cosine wave of the frequency detected by frequency controller 11 as reference signal $x_c(n)$. Reference signal $x_c(n)$ is output to adaptive filter 13$b$, corrector 14$b$, and updater 15$b$.

Adaptive filter 13$a$ multiples reference signal $x_s(n)$, which is output from sinusoidal-wave generator 12$a$, by filter factor A(n). Filter factor A(n) is successively updated by updater 15$a$. Cancellation signal A(n) $x_s(n)$ obtained by multiplying reference signal $x_s(n)$ by filter factor A(n) is output to adder 13$c$.

Adaptive filter 13$b$ multiples reference signal $x_c(n)$, which is output from cosine-wave generator 12$b$, by filter factor B(n). Filter factor B(n) is successively updated by updater 15$b$. Cancellation signal $B(n)x_c(n)$ obtained by multiplying reference signal $x_c(n)$ by filter factor B(n) is output to adder 13$c$.

Adder 13$c$ adds cancellation signal $A(n)x_s(n)$ output from adaptive filter 13$a$ and cancellation signal $B(n)x_c(n)$ output from adaptive filter 13$b$ together so as to generate cancellation signal y(n). Adder 13$c$ outputs generated cancellation signal y(n) to loudspeaker 52.

Corrector 14$a$ generates corrected reference signal $r_s(n)$ by correcting (filtering) reference signal $x_s(n)$ with use of simulated transfer function $C_m\hat{}(z)$. Corrected reference signal $r_s(n)$ generated is output to updater 15$a$.

Note that simulated transfer function $C_m\hat{}(z)$ is the transfer function that simulates acoustic transfer function $C_m(z)$ from the position of loudspeaker 52 to the position of microphone 53. Specifically, simulated transfer function $C_m\hat{}(z)$ is gain and phase (phase delay) for each frequency. For example, simulated transfer function $C_m\hat{}(z)$ may be measured in advance for each frequency in the space and stored in a storage (not shown) of active noise reduction device 10. That is, this storage stores the frequency and the gain and phase for correcting signals of this frequency.

Corrector 14$b$ generates corrected reference signal $r_c(n)$ by correcting (filtering) reference signal $x_c(n)$ with use of simulated transfer function $C_m\hat{}(z)$. Corrected reference signal $r_c(n)$ generated is output to updater 15$b$.

Updater 15$a$ calculates filter factor A (n) on the basis of corrected reference signal $r_s(n)$ acquired from corrector 14$a$ and error signal e(n) output from microphone 53, and outputs calculated filter factor A(n) to adaptive filter 13$a$. Updater 15$a$ also successively updates filter factor A(n) by using [Math. 5] given above. That is, updater 15$a$ updates filter factor A(n) by using the formula of updating including step-size parameter u (parameter related to the rate of updating).

Updater 15$b$ calculates filter factor B(n) on the basis of corrected reference signal $r_c(n)$ acquired from corrector 14$b$ and error signal e(n) output from microphone 53 and outputs calculated filter factor B(n) to adaptive filter 13$b$. Updater 15$b$ also successively updates filter factor B(n) by using [Math. 6] given above. That is, updater 15$b$ updates filter factor B(n) by using the formula of updating including step-size parameter $\mu$.

[Exemplary Operation 1]

There is a problem with active noise reduction device 10 that it is difficult to achieve satisfactory noise reduction if a frequency drift occurs between the frequency of noise (the muffled engine sound) generated in space 51 in the vehicle interior and the first frequency that corresponds to the engine speed of engine 54 detected (calculated) from the signal indicating the engine speed of engine 54.

This frequency drift will increase if abrupt variations occur in the engine speed of engine 54. That is, the frequency drift occurs in scenes such as when the engine is started, when vehicle 50 is accelerated sharply, and when vehicle 50 is decelerated sharply. A certain degree of frequency drift can be corrected by the adaptive filter updating the filter factors, but in the case where abrupt variations occur in the engine speed of engine 54, only updating the filter factors is not enough to correct the frequency drift. In the worst case, not only it becomes impossible to reduce noise by cancellation sound, but even cancellation sound itself may be heard as unusual sound.

With the proliferation of so-called hybrid vehicles, there are more scenes in which abrupt variations occur in engine speed. In particular, the inability to satisfactorily reduce noise against a great change in engine speed at the time of engine start is an issue to be solved in order to improve silence in space 51.

Figure 7:
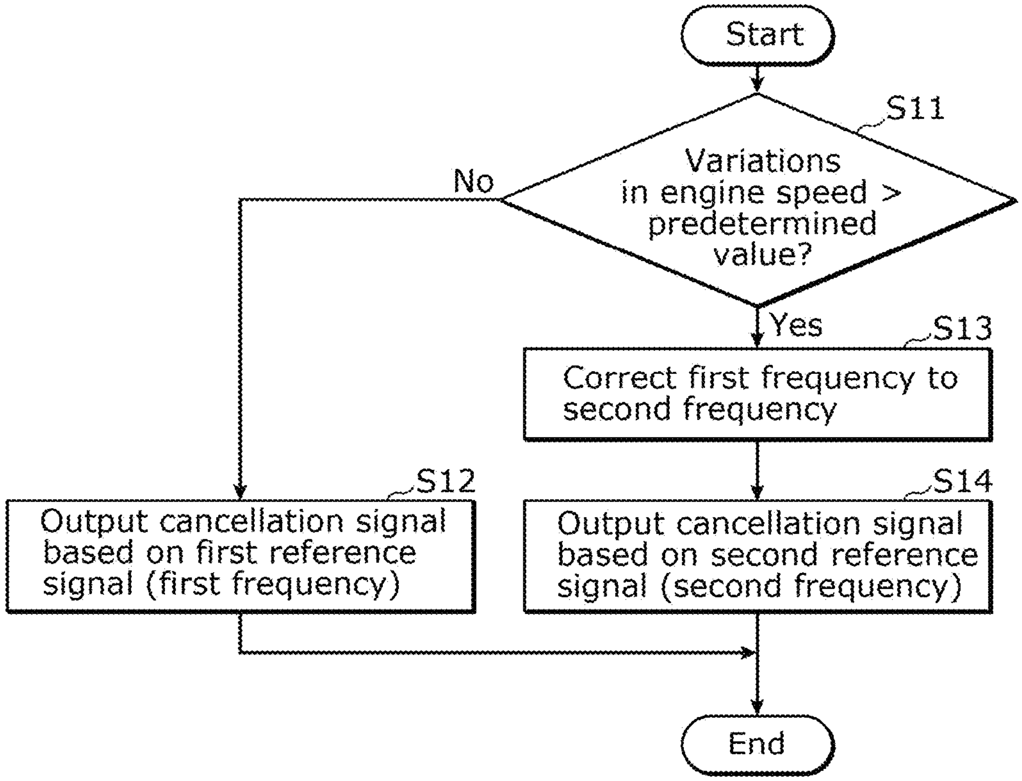
FIG. 7 is a flowchart showing exemplary operation 1 of the active noise reduction device according to the embodiment.

Hence, in the case where abrupt variations occur in engine speed, active noise reduction device 10 reduces a frequency drift and improves noise reducing performance by correcting (offsetting) the frequency (hereinafter, also referred to as the first frequency) that corresponds to the engine speed detected based on [Math. 7] given above. Hereinafter, such exemplary operation 1 will be described. FIG. 7 is a flowchart of exemplary operation 1 of active noise reduction device 10.

First, frequency controller 11 determines whether the amount of variation (the rate of change) in the engine speed of engine 54 exceeds a predetermined value (S11). The predetermined value may, for example, be 500 rpm/sec, but may be determined as appropriate by empirical or experimental means.

For example, in a fixed time period starting from the start timing of engine 54, frequency controller 11 may determine that the amount of variation in the engine speed of the engine exceeds the predetermined value. For example, frequency controller 11 may acquire the ignition signal indicating ignition from the ECU and determine a fixed time period starting from the timing of acquisition of the ignition signal as the period in which the amount of variation in engine speed exceeds the predetermined value.

Alternatively, frequency controller 11 may actually calculate the amount of variation in the engine speed of engine 54 and determine whether the calculated amount of variation in engine speed exceeds the predetermined value. For example, frequency controller 11 may be capable of calculating the amount of variation in the engine speed of engine 54 by acquiring the signal indicating the engine speed of engine 54 (the analog signal output from engine controller 55 or the digital signal output from ECU 56). As another alternative, frequency controller 11 may also use, in addition to the signal indicating the engine speed, at least one of the signals output from ECU 56, the signals including the signal indicating the degree of acceleration opening, the signal indicating vehicle speed, the signal indicating the engine's torque, the signal indicating the gear status of vehicle 50, and the signal indicating the acceleration of vehicle 50 in order to determine (predict) whether the amount of variation in engine speed exceeds the predetermined value.

When the amount of variation in the engine speed of engine 54 has been determined not to exceed the predetermined value (No in S11), frequency controller 11 outputs a cancellation signal based on a first reference signal having the first frequency from adaptive filter 13 (S12). That is, active noise reduction device 10 performs usual noise reduction processing. Specifically, frequency controller 11 detects the first frequency that corresponds to the engine speed of engine 54 in accordance with [Math. 7] given above and causes reference-signal generator 12 (sinusoidal-wave generator 12*a* and cosine-wave generator 12*b*) to generate the first reference signal having the first frequency. In this way, the cancellation signal based on the first reference signal is output from adaptive filter 13.

On the other hand, when the amount of variation in the engine speed of engine 54 has been determined to exceed the predetermined value (Yes in S11), frequency controller 11 corrects the first frequency defined based on [Math. 7] given above to a second frequency (S13) and outputs a cancellation signal based on a second reference signal having the second frequency from adaptive filter 13 (S14). Specifically, frequency controller 11 causes reference-signal generator 12 to generate the second reference signal having the second frequency. In this way, the cancellation signal based on the second reference signal is output from adaptive filter 13.

In the case where the engine speed of engine 54 varies in the direction of increase in step S11, frequency controller 11 corrects the first frequency to the second frequency by adding a correction value greater than 0 to the first frequency in step S13. In the case where the engine speed of engine 54 varies in the direction of decrease in step S11, frequency controller 11 corrects the first frequency to the second frequency by adding a correction value smaller than 0 to the first frequency in step S13.

Figure 8:
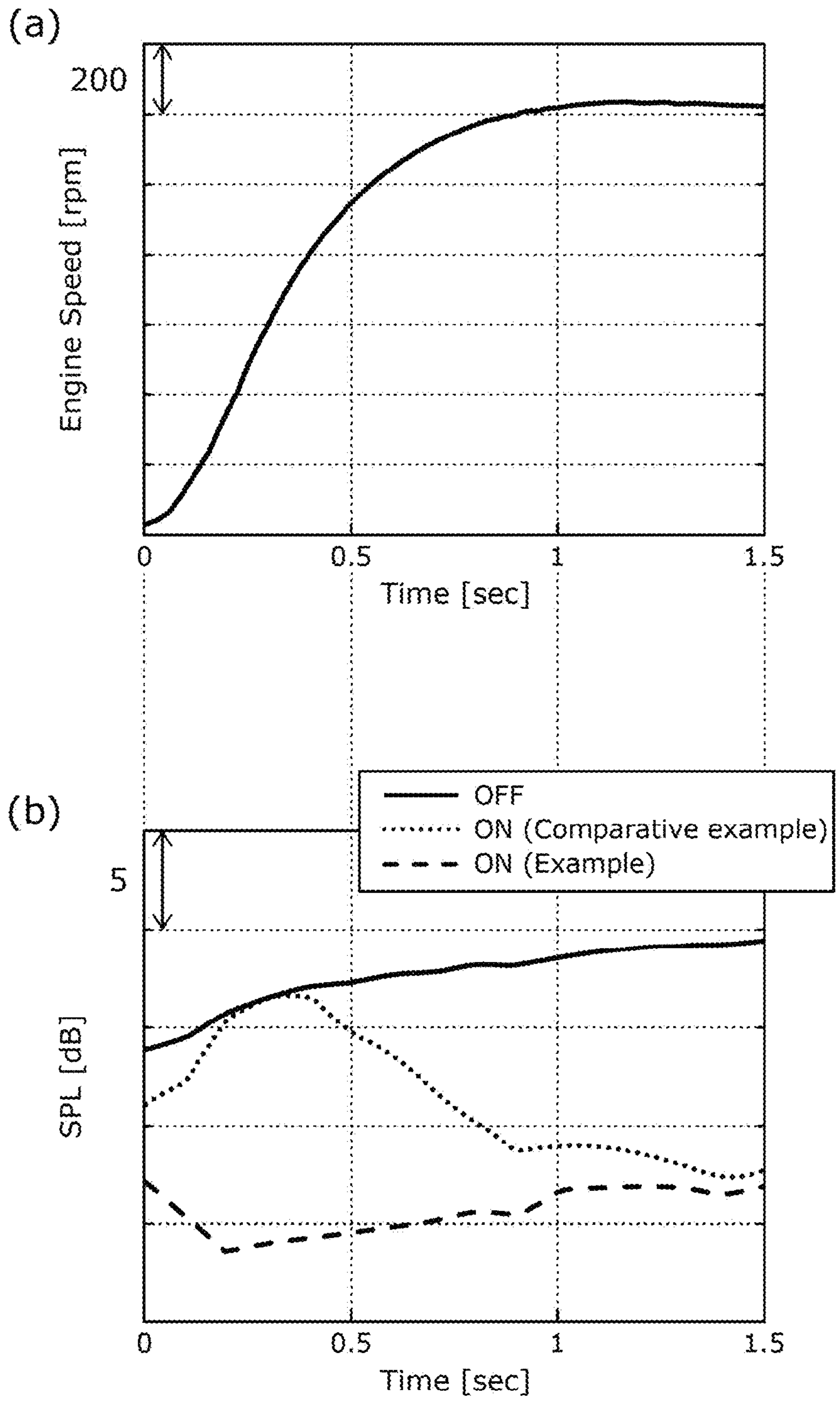
FIG. 8 is a diagram showing noise reducing characteristics for the case where abrupt variations occur in engine speed.

FIG. 8 is a diagram showing noise reducing characteristics for the case where abrupt variations (specifically, an abrupt increase) occur in the engine speed of engine 54. In FIG. 8, (a) is the graph that shows variations in the engine speed of engine 54 and in which the vertical axis indicates engine speed and the horizontal axis indicates time. In FIG. 8, (b) shows noise reducing characteristics for the case where the engine speed of engine 54 has varied as shown in (a) in FIG. 8, the vertical axis indicating sound pressure level, the horizontal axis indicating time.

In FIG. 8, (b) shows noise reducing characteristics for the case where active noise reduction device 10 is in the OFF state (OFF), the case where usual noise reduction processing is performed while the frequency of the reference signal remains at the first frequency (ON in Comparative Example), and the case where noise reduction processing is performed after the frequency of the reference signal is corrected to the second frequency (ON in Example). As shown in (b) in FIG. 8, Examples shows satisfactory noise reduction even in a time period in which an abrupt increase has occurred in the engine speed of engine 54.

In this way, active noise reduction device 10 reduces a frequency drift by correcting the first frequency to the second frequency in the case where an abrupt variation has been determined to occur in engine speed. This improves the adaptive speed of the adaptive filter and accordingly allows the cancellation sound to follow the change in the frequency of noise. That is, active noise reduction device 10 is capable of improving noise reducing performance.

Note that the technique for correcting the frequency of a reference signal is in particular useful in cases where the resolution of the adaptive filter is subjected to hardware or software constraints.

[Correction Method 1]

Figure 9:
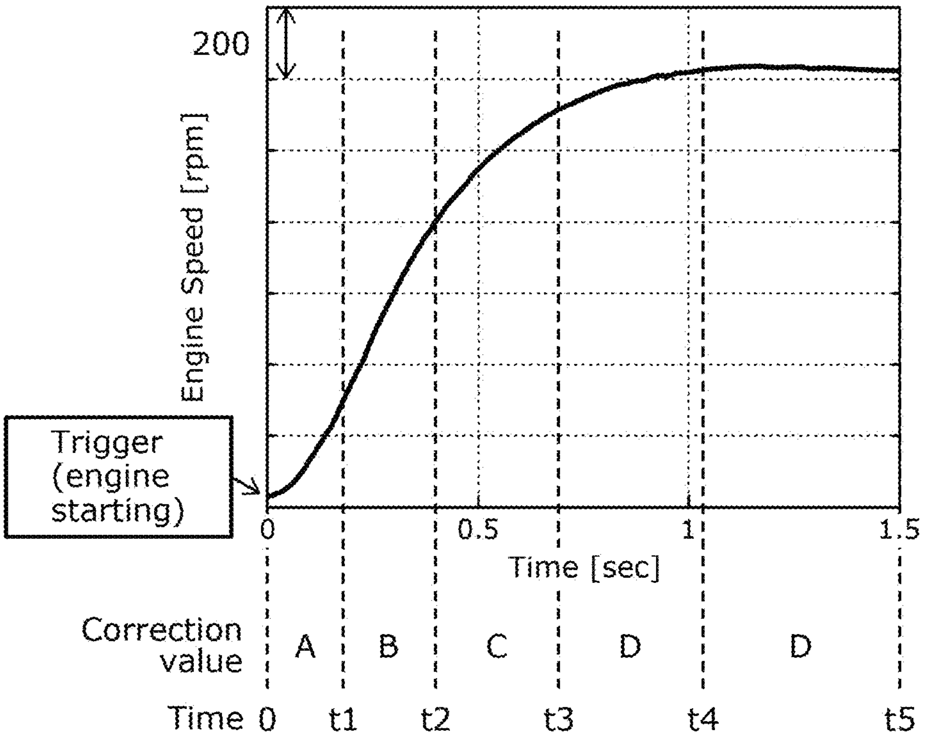
FIG. 9 is a diagram for describing correction method 1.

A specific example of the method of correcting the frequency in step S13 will be described hereinafter. First, description is given of a correction method used in a fixed time period starting from the start timing of engine 54 will be described. FIG. 9 is a diagram for describing the correction method used in a fixed time period starting from the start timing of engine 54 (hereinafter, also referred to as “correction method 1”). In FIG. 9, the vertical axis indicates the engine speed of engine 54, and the horizontal axis indicates time.

Frequency controller 11 calculates the second frequency according to time t (in other words, elapsed time) when the start timing of engine 54 is taken as 0, in accordance with the following four formulas.

$$\text{Second frequency} = \text{First frequency} + A(0 \le t < t1)$$

$$\text{Second frequency} = \text{First frequency} + B(t1 \le t < t2)$$

$$\text{Second frequency} = \text{First frequency} + C(t2 \le t < t3)$$

$$\text{Second frequency} = \text{First frequency} + D(t3 \le t)$$

A, B, C, and D represent correction values and are all positive values, but D may be zero. For example, the amount of correction (the absolute value of the correction value) may be defined to become larger for a section with a greater amount of variation in the engine speed of engine 54 (the absolute value of the variation value). The correction value may be determined as appropriate by empirical or experimental means by the designer or the like of active noise reduction device 10.

The storage of active noise reduction device 10 stores a correction-value map that associates the elapsed time and the correction value and corresponds to the aforementioned four formulas, and frequency controller 11 is capable of correcting the first frequency to the second frequency by referencing to (reading out) the correction-value map.

While FIG. 9 shows the correction method used in the case where an abrupt increase occurs in the engine speed of engine 54 (in the case where the variation value is positive), the same applies to a correction method used in the case where an abrupt decrease occurs in the engine speed of engine 54 (in the case the variation value is negative). It is, however, noted that the correction value becomes a negative value in the case where an abrupt decrease occurs in the engine speed of engine 54. Since noise itself decreases in the case where an abrupt decrease occurs in the engine speed of engine 54, the processing for correcting the frequency may be omitted.

In this way, active noise reduction device 10 is capable of determining the correction value according to the time elapsed since predetermined reference timing such as the start timing of engine 54.

[Correction Method 2]

Figure 10:
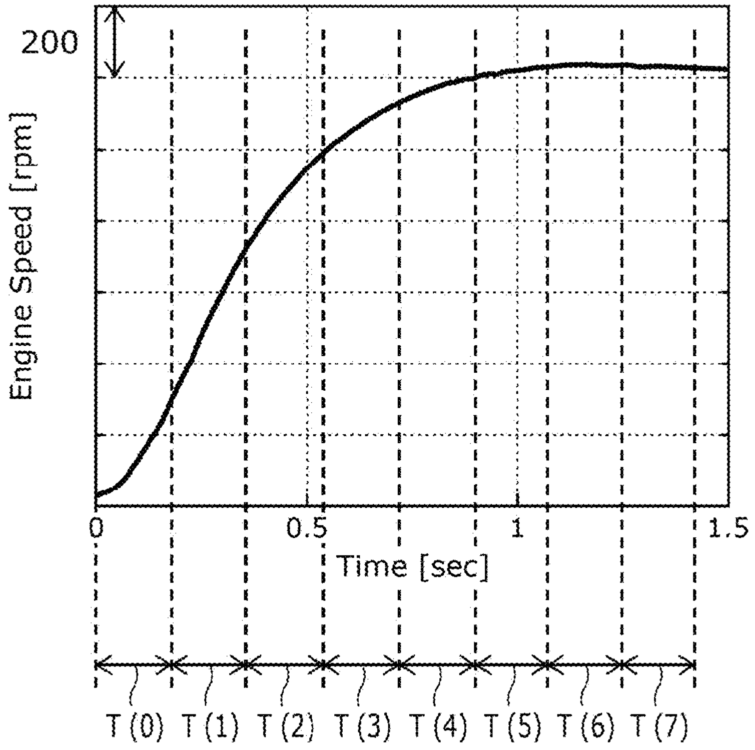
FIG. 10 is a diagram for describing correction method 2.

Next, description is given of a correction method used in the case where the amount of variation (variation value) in the engine speed of engine 54 is actually calculated. FIG. 10 is a diagram for describing the correction method used in the case where the amount of variation in the engine speed of engine 54 is calculated (hereinafter, also referred to as “correction method 2”). In FIG. 10, the vertical axis indicates the engine speed of engine 54, and the horizontal axis indicates time.

Frequency controller 11 calculates a variation value of the engine speed for each time period T and determines a correction value for next time period T(n+1) after time period T(n) on the basis of the variation value of the engine speed of engine 54 for time period T(n), where n is an integer greater than or equal to 0. As shown in FIG. 10, in the case where an abrupt increase occurs in the engine speed of engine 54, the correction value becomes a positive value. For example, the amount of correction (the absolute value of the correction value) is defined so as to become larger with increasing amount of variation in the engine speed of engine 54 (the absolute value of the variation value). The correction value may be determined as appropriate by empirical or experimental means by the designer or the like of active noise reduction device 10. In the case where the amount of variation in the engine speed of engine 54 for time period T(n) is less than or equal to a predetermined value, the correction value for time period T(n+1) becomes 0. The length of time period T(n) is constant, but may be variable.

The storage of active noise reduction device 10 stores a correction-value map that associates the variation value of the engine speed of engine 54 with the correction value, and frequency controller 11 is capable of correcting the first frequency to the second frequency by referencing to (reading out) the correction-value map.

While FIG. 10 shows the correction method used in the case where there an abrupt increase occurs in the engine speed of engine 54 (in the case where the variation value is positive), the same applies to the correction method used in the case where an abrupt decrease occurs in the engine speed of engine 54 (in the case where the variation value is negative). It is, however, noted that the correction value becomes negative when an abrupt decrease occurs in the engine speed of engine 54. Since noise itself decreases in the case where an abrupt decrease occurs in the engine speed of engine 54, the processing for correcting the frequency may be omitted.

In this way, active noise reduction device 10 is capable of calculating the amount of variation in engine speed for each time period T and determining the correction value for time period T(n+1) on the basis of the amount of variation in the engine speed of engine 54 for time period T(n).

Note that active noise reduction device 10 may be achieved as a device that is capable of executing only either of correction method 1 and correction method 2, or may be achieved as a device that is capable of executing both of correction method 1 and correction method 2.

For example, active noise reduction device 10 may use correction method 1 and correction method 2 in combination in such a manner that correction method 1 is used in cases such as where engine 54 is started, where vehicle 50 is in the idling stop state, and where the engine speed of engine 54 changes from a fixed point to another fixed point, whereas correction method 2 is used in cases such as where vehicle 50 is accelerated sharply, where vehicle 50 is deaccelerated sharply, and where a shift change occurs in vehicle 50. Specifically, the case where the engine speed of engine 54 changes from a fixed point to another fixed point refers to, for example, the case where engine 54 charges the battery or the case where the engine speed of engine 54 of a series-system hybrid vehicle changes from a predetermined first engine speed to a predetermined second engine speed (i.e., in the case where the charging speed of the battery is changed).

[Exemplary Operation 2]

Figure 11:
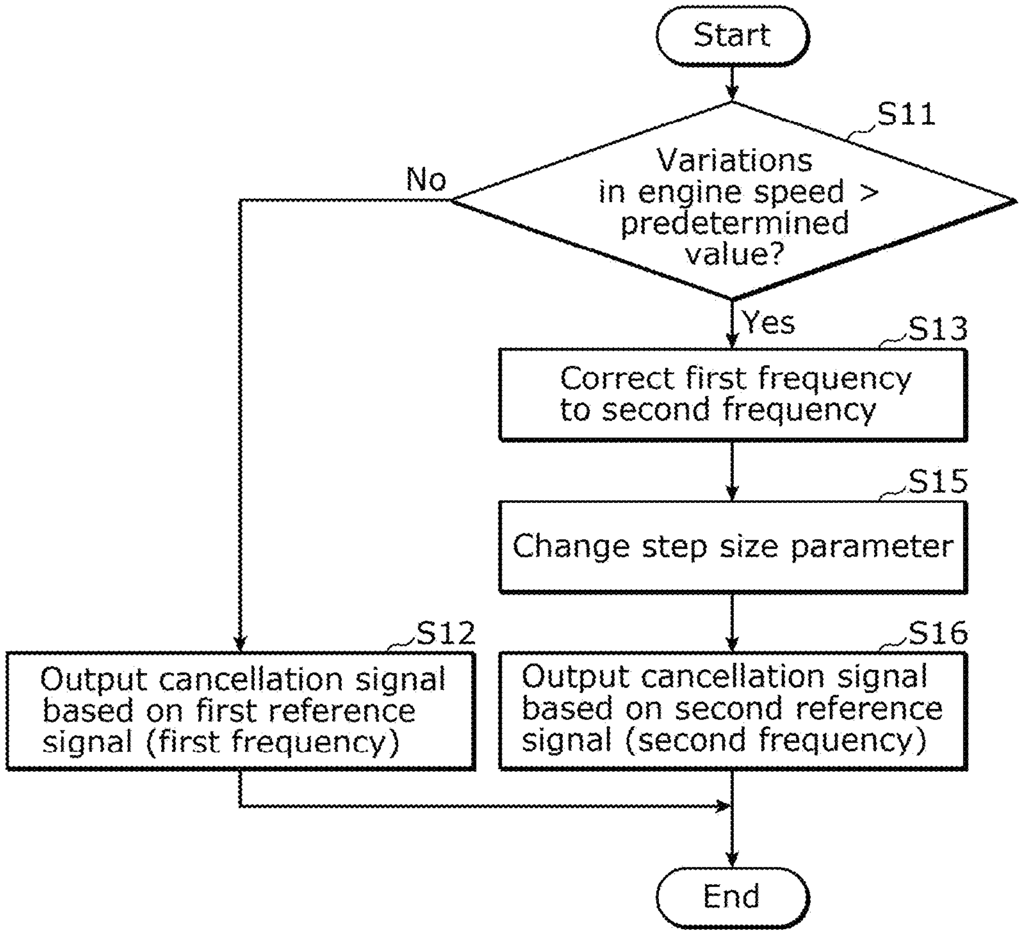
FIG. 11 is a flowchart showing exemplary operation 2 of the active noise reduction device according to the embodiment.

Active noise reduction device 10 may change step-size parameters μ in addition to correcting the frequency of the reference signal. FIG. 11 is a flowchart of exemplary operation 2 of such active noise reduction device 10.

Processing in steps S11 and S12 is similar to the processing in exemplary operation 1. When the amount of variation in the engine speed of engine 54 has been determined to exceed the predetermined value (Yes in S11), frequency controller 11 corrects the first frequency, which is defined based on [Math. 7] given above, to the second frequency (S13). Processing in step S13 is similar to the processing in exemplary operation 1.

Frequency controller 11 further changes step-size parameters u expressed by [Math. 5] and [Math. 6] given above (S15). Frequency controller 11 changes the values of step-size parameters u to larger values than the values of step-size parameters u used in step S12. That is, frequency controller 11 changes step-size parameters u such that the rate of updating of the filter factors becomes faster than the rate of updating of step-size parameters u for the case where the amount of variation in the engine speed of engine 54 is determined to be less than or equal to a predetermined value.

Thereafter, frequency controller 11 outputs a cancellation signal based on the second reference signal having the second frequency from adaptive filter 13 (S16). Here, the filter factor of adaptive filter 13 is updated based on an update formula modelled after step-size parameters μ have been changed.

In this way, when an abrupt variation has been determined to occur in engine speed, active noise reduction device 10 corrects the first frequency to the second frequency and changes the values of step-size parameters u to larger values than usual. This improves the adaptive speed of adaptive filter 13 and accordingly allows cancellation sound to follow the change in the frequency of noise. That is, active noise reduction device 10 is capable of improving noise reducing performance.

In the case where the amount of variation in the engine speed of engine 54 is determined to exceed the predetermined value, frequency controller 11 may change step-size parameters u such that the rate of updating of the filter factors becomes faster with increasing amount of variation in the engine speed of engine 54.

As in correction method 1, frequency controller 11 may also change step-size parameters u according to the time elapsed from the reference timing. In this case, the storage of active noise reduction device 10 stores a correction-value map that associates the elapsed time with the correction values for step-size parameters u, and frequency controller 11 is capable of changing step-size parameters μ by referencing to (reading out) the correction-value map.

As in correction method 2, frequency controller 11 may calculate the amount of variation in engine speed for each time period T and determine step-size parameters μ for time period T(n+1) on the basis of the amount of variation in the engine speed of engine 54 for time period T(n). In this case, the storage of active noise reduction device 10 stores a correction-value map that associates the amount of variation in the engine speed of engine 54 with the correction values for step-size parameters μ, and frequency controller 11 is capable of changing step-size parameters u by referencing to (reading out) the correction-value map.

[Active Noise Reduction Device with Feedback Filter]

Figure 12:
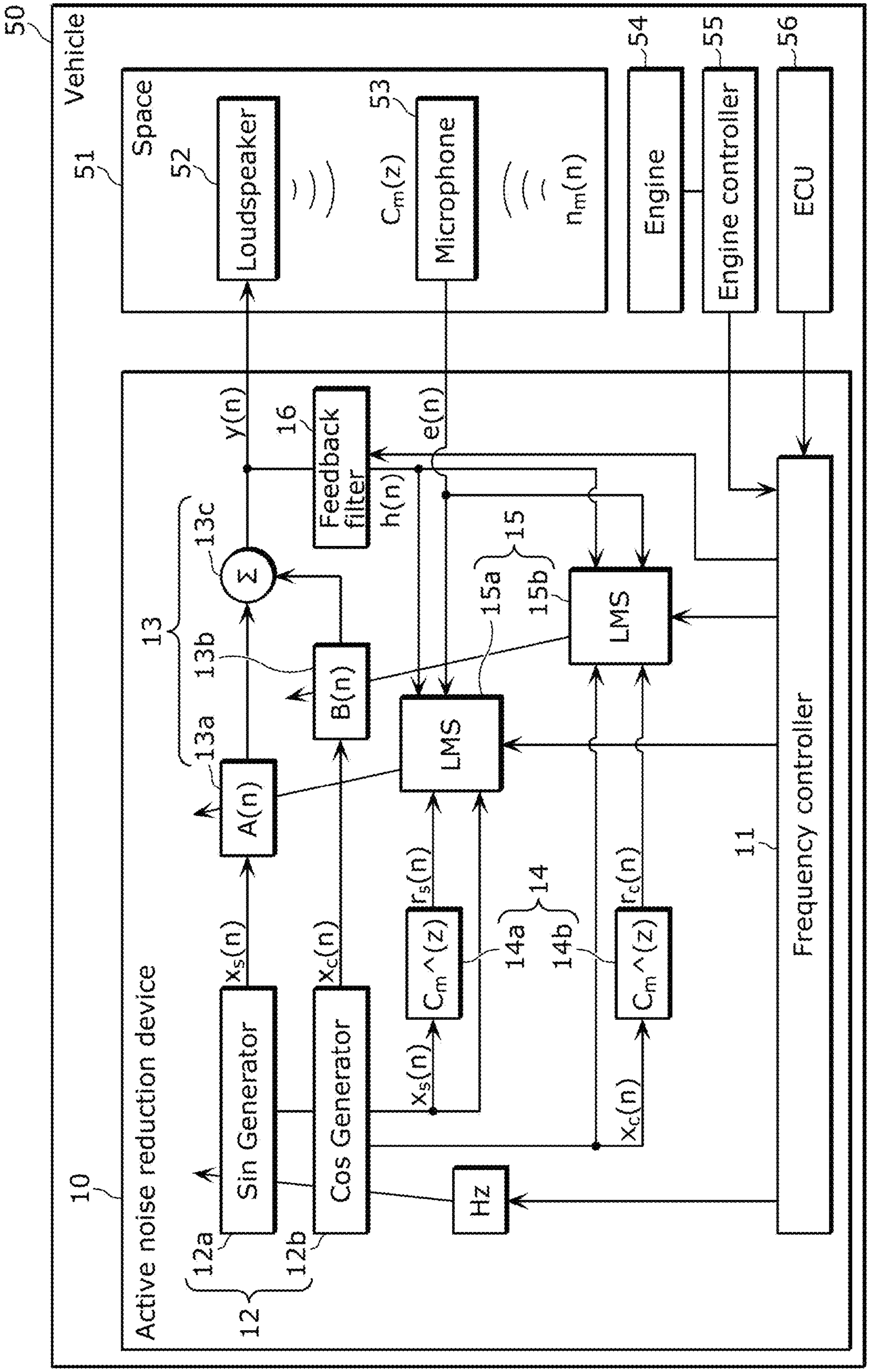
FIG. 12 is a block diagram showing a functional configuration of an active noise reduction device that includes a feedback filter.

Active noise reduction device 10 may further include a feedback filter. FIG. 12 is a block diagram showing a functional configuration of active noise reduction device 10 provided with a feedback filter.

Feedback filter 16 multiplies cancellation signal y(n) output from adder 13*c* by a gain coefficient. Feedback filter 16 outputs (feeds back) cancellation signal h(n), which is obtained by multiplying cancellation signal y(n) by gain coefficient α, to updaters 15*a* and 15*b*.

The following description is given of a formula for updating the LMS in order to calculate filter factors A(n) and B(n) in the case where active noise reduction device 10 includes feedback filter 16. Feedback filter 16 generates output signal h(n) by multiplying cancellation signal y(n) by gain coefficient α, where h(n) is expressed by [Math. 8] given below, using [Math. 4].

$$h(n)=ay(n)=a\{A(n)x_s(n)+B(n)x_c(n)\} \quad \text{[Math. 8]}$$

The formulas for updating the LMS, expressed by [Math. 5] and [Math. 6], are expressed by [Math. 9] and [Math. 10] given below, using [Math. 8].

$$\begin{aligned}A(n+1)&=A(n)-\mu r_s(n)e(n)-\mu x_s(n)h(n) \quad \text{[Math. 9]}\\&=A(n)-\mu r_s(n)e(n)-\mu x_s(n)a\{A(n)x_s(n)+B(n)x_c(n)\}\end{aligned}$$

$$\begin{aligned}B(n+1)&=B(n)-\mu r_c(n)e(n)-\mu x_c(n)h(n) \quad \text{[Math. 10]}\\&=B(n)-\mu r_c(n)e(n)-\mu x_c(n)a\{A(n)x_s(n)+B(n)x_c(n)\}\end{aligned}$$

Figure 13:
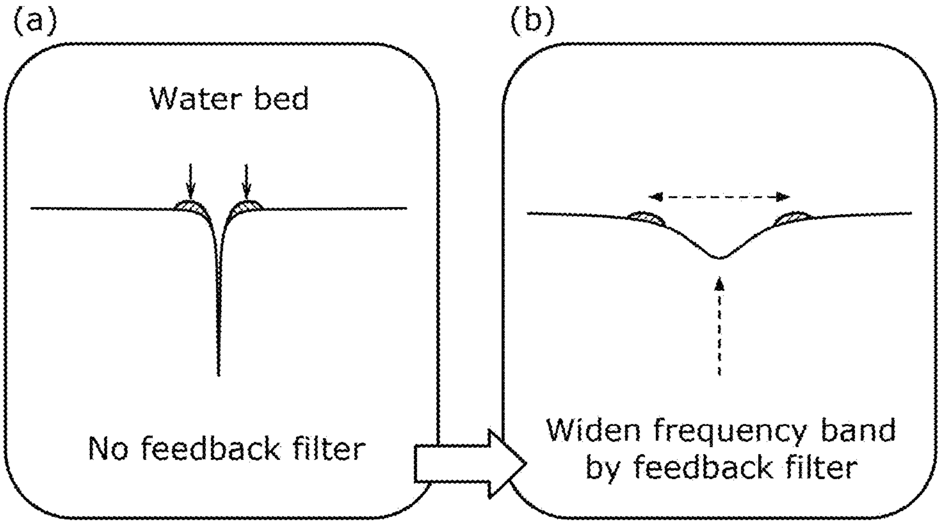
FIG. 13 is a diagram schematically showing the widening of the range of noise reducing characteristics by addition of the feedback filter.

As shown by [Math. 9] and [Math. 10] given above, gain coefficient α is the coefficient for adjusting the rate of updating of filter factors A(n) and B(n). Multiplication by gain coefficient a is equivalent to producing cancellation sound $c_m$(n)*y(n) at the position of microphone 53 in numerical computation. Thus, active noise reduction device 10 is capable of adjusting stability and a noise reducing amount by using the value of gain coefficient α. If gain coefficient a is greater than 0, it is possible to widen the range of noise reducing characteristics. FIG. 13 is a diagram schematically showing how to widen the range of noise reducing characteristics by addition of feedback filter 16. In FIG. 13, (a) shows noise reducing characteristics of active noise reduction device 10 with the functional configuration shown in FIG. 6, and (b) shows noise reducing characteristics of active noise reduction device 10 with the functional configuration shown in FIG. 12. As shown in FIG. 13, feedback filter 16 widens the range of noise reducing characteristics and increases the possibility of being able to reduce noise even if the aforementioned frequency drift occurs. That is, active noise reduction device 10 exhibits improved stability. As the value of gain coefficient a increases, active noise reduction device 10 exhibits more improved stability and is capable of more widening the range of noise reducing characteristics, but the amount of noise reduction decreases.

[Exemplary Operation 3]

Figure 14:
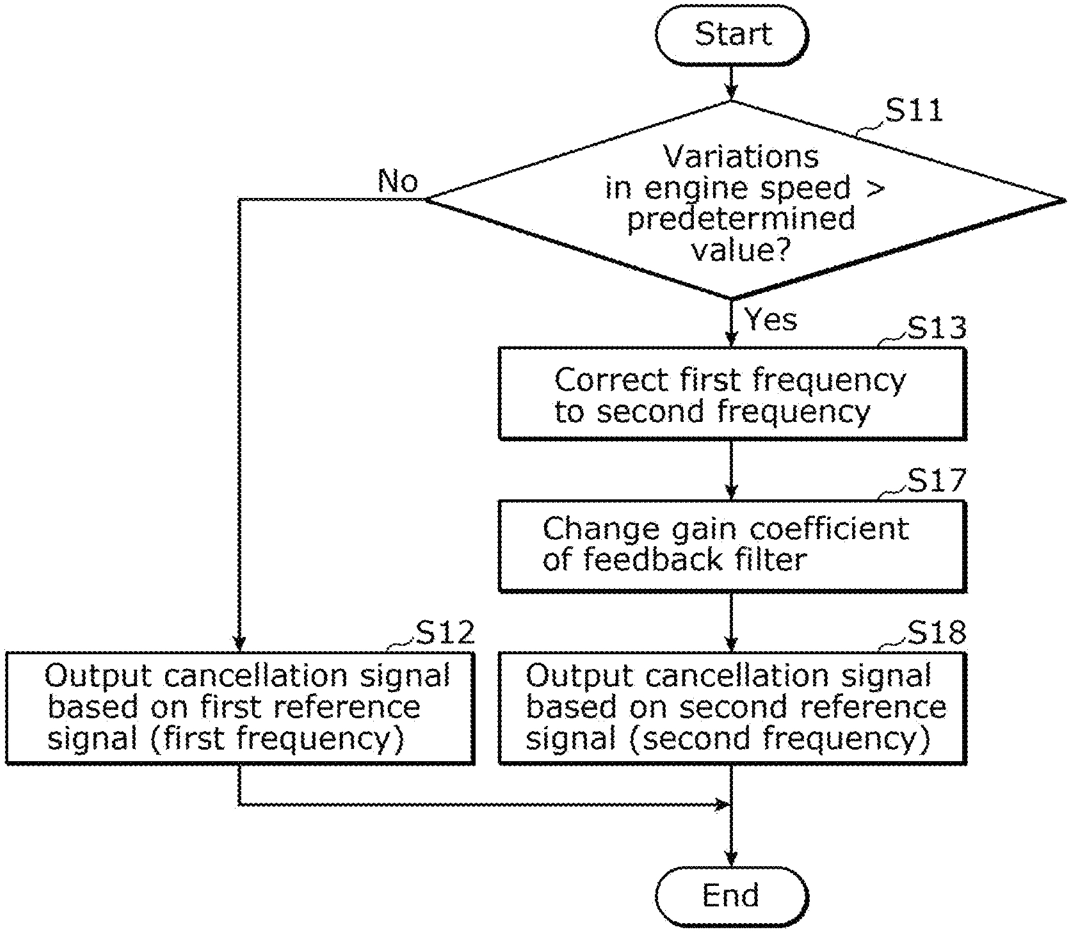
FIG. 14 is a flowchart showing exemplary operation 3 of the active noise reduction device according to the embodiment.

Active noise reduction device 10 including feedback filter 16 may further change gain coefficient a in addition to correcting the frequency of the reference signal. FIG. 14 is a flowchart of exemplary operation 3 of such active noise reduction device 10.

Processing in steps S11 and S12 is similar to the processing in exemplary operation 1. When the amount of variation in the engine speed of engine 54 has been determined to exceed the predetermined value (Yes in S11), frequency controller 11 corrects the first frequency, which is defined based on [Math. 7] given above, to the second frequency (S13). Processing in step S13 is similar to the processing in exemplary operation 1.

Frequency controller 11 also changes gain coefficient a in [Math. 9] and [Math. 10] given above (S17). Frequency controller 11 changes the value of gain coefficient a to a value greater than the value of gain coefficient a used in step S12. That is, when the amount of variation in the engine speed of engine 54 has been determined to exceed the predetermined value, frequency controller 11 changes gain coefficient a to a value greater than the value used in the case where the amount of variation in the engine speed of engine 54 has been determined to be less than or equal to the predetermined value.

Thereafter, frequency controller 11 outputs a cancellation signal based on the second reference signal having the second frequency from adaptive filter 13 (S18). Here, the filter factor of adaptive filter 13 is updated based on an update formula modelled after gain coefficient a has been changed.

In this way, when an abrupt variation has been determined to occur in engine speed, active noise reduction device 10 corrects the first frequency to the second frequency and changes the value of gain coefficient a to a value greater than usual. This improves the adaptive speed of the adaptive filter and improves the stability of active noise reduction device 10. That is, active noise reduction device 10 is capable of improving noise reducing performance.

In the case where the amount of variation in the engine speed of engine 54 has been determined to exceed the predetermined value, frequency controller 11 may change the value of gain coefficient a to a greater value with increasing amount of variation in the engine speed of engine 54.

Moreover, as in correction method 1, frequency controller 11 may change gain coefficient a according to the time elapsed since the reference timing. In this case, the storage of active noise reduction device 10 stores a correction-value map that associates the elapsed time with the correction value for gain coefficient a, and frequency controller 11 is capable of changing gain coefficient a by referencing to (reading out) the correction-value map.

As in correction method 2, frequency controller 11 may calculate the amount of variation in engine speed for each time period T and determine gain coefficient a for time period T (n+1) on the basis of the amount of variation in the engine speed of engine 54 during time period T(n). In this case, the storage of active noise reduction device 10 stores a correction-value map that associates the amount of variation in the engine speed of engine 54 with the correction value for gain coefficient α, and frequency controller 11 is capable of changing gain coefficient a by referencing to (reading out) the correction-value map.

Active noise reduction device 10 including feedback filter 16 may also change step-size parameters μ and gain coefficient α, in addition to correcting the frequency of the reference signal. That is, exemplary operations 2 and 3 may be combined in any way.

[Exemplary Operation 4]

In the case of an unintended state of acoustic transfer function $C_m(z)$ of space 51 and depending on environmental conditions in space 51 such as where noise $n_m(n)$ is in an unintended state due to the generation of noise other than the muffled engine sound in space 51, there is a possibility that the noise reducing effect may not be improved even if the frequency of the reference signal is corrected.

Figure 15:
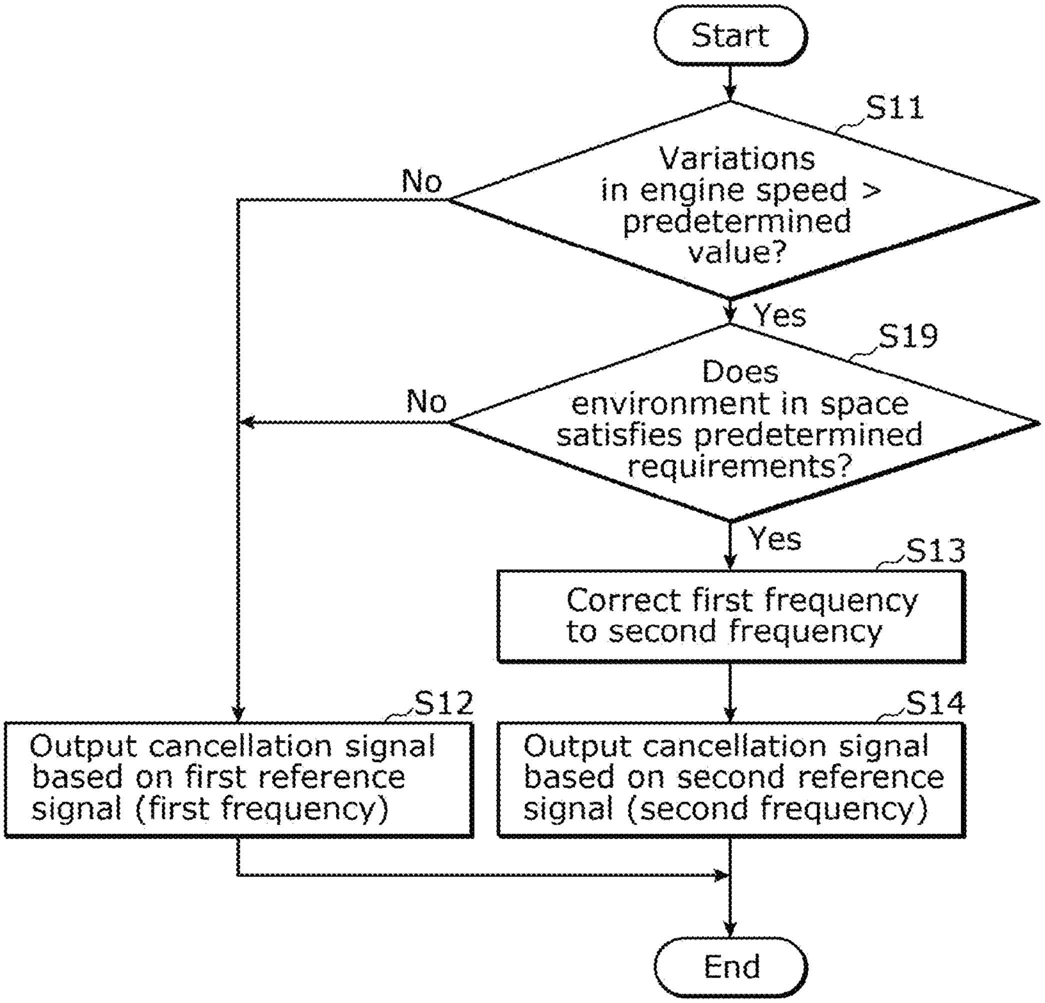
FIG. 15 is a flowchart showing exemplary operation 4 of the active noise reduction device according to the embodiment.

To address this, frequency controller 11 may determine whether the environment in space 51 satisfies predetermined requirements. FIG. 15 is a flowchart of exemplary operation 4 of such active noise reduction device 10.

Processing in steps S11 and S12 is similar to the processing in exemplary operation 1. When the amount of variation in the engine speed of engine 54 has been determined to exceed the predetermined value (Yes in S11), frequency controller 11 determines whether the environment in space 51 satisfies predetermined requirements (S19).

In step S19, frequency controller 11 may determine, for example, whether acoustic transfer function $C_m(z)$ of space 51 satisfies a predetermined requirement (in an intended state). For example, frequency controller 11 may make the following determinations including:

(1) whether the windows of vehicle 50 are closed;
(2) whether the doors of vehicle 50 are closed;
(3) whether the temperature in space 51 is within a predetermined range; and
(4) whether the temperature outside space 51 is within a predetermined range.

Note that frequency controller 11 is capable of making determination (1) by acquiring the signal indicating the open/closed state of the windows of vehicle 50 from ECU 56, and is capable of making determination (2) by acquiring the signal indicating the open/closed state of the doors of vehicle 50 from ECU 56. Frequency controller 11 is capable of making determination (3) by acquiring the signal indicating the temperature inside vehicle 50 (temperature in space 51) from ECU 56, and is capable of making determination (4) by acquiring the signal indicating the temperature outside vehicle 50 from ECU 56.

In step S19, frequency controller 11 may further determine whether the state of noise $n_m(n)$ in space 51 satisfies a predetermined requirement (noise is in an intended state). For example, frequency controller 11 may determine whether the volume of air received from the air conditioner provided in vehicle 50 is small (the influence on noise $n_m(n)$ is small) on the basis of the operating state of the air conditioner. Frequency controller 11 is capable of making this determination by acquiring, from ECU 56, the signal indicating the volume of air received from the air conditioner provided in vehicle 50.

In step S19, at least one of those determinations may be made. In the case of making a plurality of determinations in step S19, the processing may proceed to Yes in step S19 if predetermined requirements are satisfied in all of the determinations or if predetermined requirements are satisfied in a predetermined number of determinations among the plurality of determinations.

In the case where the environment in space 51 has been determined not to satisfy predetermined requirements, frequency controller 11 outputs a cancellation signal based on the first reference signal having the first frequency from adaptive filter 13 (S12). That is, active noise reduction device 10 performs normal noise reduction processing.

On the other hand, in the case where the environment in space 51 has been determined to satisfy the predetermined requirements, frequency controller 11 corrects the first frequency to the second frequency (S13) and outputs a cancellation signal based on the second reference signal having the second frequency from adaptive filter 13 (S14).

In this way, when the amount of variation in the engine speed of engine 54 has been determined to exceed the predetermined value and when the environment in space 51 has been determined to satisfy the predetermined requirements, frequency controller 11 causes reference-signal generator 12 to generate the second reference signal so as to cause adaptive filter 13 to output the cancellation signal based on the second reference signal. When the amount of variation in the engine speed of engine 54 has been determined to be less than or equal to the predetermined value and when the environment in space 51 has been determined not to satisfy the predetermined requirements, frequency controller 11 causes reference-signal generator 12 to generate the first reference signal so as to cause adaptive filter 13 to output the cancellation signal based on the first reference signal.

Active noise reduction device 10 as described above outputs the cancellation sound (cancellation signal) based on the second reference signal after knowing whether space 51 is an appropriate environment. This reduces the occurrence of a situation in which cancellation sound is taken as unusual sound.

In exemplary operation 4, the order of the determination in step S11 and the determination in step S19 may be interchanged.

While exemplary operation 4 describes an exemplary operation in which the processing for determining whether the environment in space 51 satisfies predetermined requirements is added to exemplary operation 1, the processing for determining whether the environment in space 51 satisfies predetermined requirements may be added to exemplary operations 2 and 3.

[Variations]

While the above-described embodiment describes an example of reducing muffled engine sound (noise that is correlated with the revolution of engine 54), for example, active noise reduction device 10 may reduce noise that is correlated with the rotation of a propeller shaft. Active noise reduction device 10 may further reduce noise caused by the activation of a power source other than engine 54.

While the above-described embodiment describes an example of reducing one order component (e.g., secondary component) of noise such as muffled engine sound, active noise reduction device 10 may reduce a plurality of order components of noise (e.g., a secondary component and a biquadratic component) at the same time (in parallel).

The information such as the correction-value maps, stored in the storage of active noise reduction device 10, may be updated (corrected and added) by active noise reduction device 10 making an access to an external device such as a cloud server. In this case, for example, active noise reduction device 10 may include a communication circuit (communication module) for communication with an external device via a wide-band communication network.

Advantageous Effects

Inventive techniques derived from the disclosure of the present specification are, for example, those described below. Hereinafter, the inventive techniques derived from the disclosure of the present specification will be described in combination with advantageous effects achieved by these inventive techniques.

Inventive technique 1 represents active noise reduction device 10 that reduces noise caused by the revolution of engine 54 provided in vehicle 50 by outputting cancellation sound from loudspeaker 52 in space 51 where loudspeaker 52 and microphone 53 are installed in the interior of vehicle 50. Active noise reduction device 10 includes reference-signal generator 12, adaptive filter 13, and frequency controller 11. Reference-signal generator 12 generates a first reference signal having a first frequency that corresponds to the engine speed of engine 54. Adaptive filter 13 outputs a cancellation signal used to output cancellation sound by applying filter factors to the first reference signal, the filter factors being successively updated based on an error signal output from microphone 53. When the amount of variation in the engine speed of engine 54 has been determined to exceed a predetermined value, frequency controller 11 causes reference-signal generator 12 to generate a second reference signal having a second frequency so as to cause adaptive filter 13 to output a cancellation signal based on the second reference signal, the second frequency being obtained by correcting the first frequency. Vehicle 50 is one example of a mobile object, and engine 54 is one example of a power source.

Active noise reduction device 10 as described above corrects the first frequency to the second frequency when an abrupt variation has been determined to occur in the engine speed of engine 54. This reduces a frequency drift and improves the adaptive speed of adaptive filter 13. Accordingly, active noise reduction device 10 allows the cancellation sound to follow a change in the frequency of noise. That is, active noise reduction device 10 is capable of improving noise reducing performance.

Technique 2 is active noise reduction device 10 according to inventive technique 1, wherein frequency controller 11 determines that the amount of variation in the engine speed of engine 54 exceeds a predetermined value during a fixed time period starting from start timing of engine 54.

Active noise reduction device 10 as described above is capable of improving noise reducing performance during the fixed time period starting from the starting point of engine 54.

Technique 3 is active noise reduction device 10 according to inventive technique 2, wherein frequency controller 11 increases the amount of correction for correcting the first frequency to the second frequency with increasing amount of variation in the engine speed of engine 54 during the fixed time period.

Active noise reduction device 10 as described above makes the correction in accordance with the amount of variation in the engine speed of engine 54. This further improves noise reducing performance during the fixed time period starting from the start timing of engine 54.

Technique 4 is active noise reduction device 10 according to any one of inventive techniques 1 to 3, wherein frequency controller 11 calculates the amount of variation in the engine speed of engine 54 to determine whether the amount of variation in the engine speed of engine 54 exceeds the predetermined value.

Active noise reduction device 10 as described above is capable of improving noise reducing performance during a time period in which an abrupt variation occurs in the engine speed of engine 54.

Technique 5 is active noise reduction device 10 according to inventive technique 4, wherein when the amount of variation in the engine speed of engine 54 has been determined to exceed the predetermined value, frequency controller 11 increases the amount of correction for correcting the first frequency to the second frequency with increasing amount of variation in the engine speed of engine 54.

Active noise reduction device 10 as described above makes the correction in accordance with the amount of variation in the engine speed of engine 54. This further improves noise reducing performance during the time period in which an abrupt variation occurs in the engine speed of engine 54.

Technique 6 is active noise reduction device 10 according to any one of inventive techniques 1 to 5. Active noise reduction device 10 further includes updater 15 that updates a filter factor by using an update formula that includes a parameter related to the rate of updating. When the amount of variation in the engine speed of engine 54 has been determined to exceed the predetermined value, frequency controller 11 changes the parameter such that the rate of updating the filter factor becomes higher than in the case where the amount of variation in the engine speed of engine 54 has been determined to be less than or equal to the predetermined value. The parameter may, for example, be step-size parameter $\mu$.

Active noise reduction device 10 as described above is capable of improving noise reducing performance by increasing the rate of updating of the filter factor with increasing amount of variation in the engine speed of engine 54.

Technique 7 is active noise reduction device 10 according to inventive technique 6, wherein when the amount of variation in the engine speed of engine 54 has been determined to exceed the predetermined value, frequency controller 11 changes the parameter such that the rate of updating of the filter factor becomes higher with increasing amount of variation in the engine speed of engine 54.

Active noise reduction device 10 as described above increases the rate of updating of the filter factor in accordance with the amount of variation in the engine speed of engine 54 when the amount of variation in the engine speed of engine 54 has increased. This further improves noise reducing performance.

Technique 8 is active noise reduction device 10 according to any one of inventive techniques 1 to 7. Active noise reduction device 10 further includes feedback filter 16 and updater 15. Feedback filter 16 multiplies the cancellation signal output from adaptive filter 13 by a gain coefficient. Updater 15 updates the filter factor in accordance with the error signal and the cancellation signal multiplied by gain coefficient $\alpha$. When the amount of variation in the engine speed of engine 54 has been determined to exceed the predetermined value, frequency controller 11 changes gain coefficient a to a value greater than in the case where the amount of variation in the engine speed of engine 54 has been determined to be less than or equal to the predetermined value.

Active noise reduction device 10 as described above widens the range of noise reducing characteristics when the amount of variation in the engine speed of engine 54 has increased. This further stabilizes noise reducing performance.

Technique 9 is active noise reduction device 10 according to inventive technique 8, wherein when the amount of variation in the engine speed of engine 54 has been determined to exceed the predetermined value, frequency controller 11 changes gain coefficient a to a greater value with increasing amount of variation in the engine speed of engine 54.

Active noise reduction device 10 as described above widens the range of noise reducing characteristics in accordance with the amount of variation in the engine speed of engine 54 when the amount of variation in the engine speed of engine 54 has increased. This further stabilizes noise reducing performance.

Technique 10 is active noise reduction device 10 according to any one of inventive techniques 1 to 9, wherein when the amount of variation in the engine speed of engine 54 has been determined to exceed the predetermined value and when the environment in space 51 has been determined to satisfy a predetermined requirement, frequency controller 11 causes reference-signal generator 12 to generate the second reference signal so as to cause adaptive filter 13 to output the cancellation signal based on the second reference signal.

Active noise reduction device 10 as described above outputs the cancellation sound (cancellation signal) based on the second reference signal after knowing whether space 51 is in an appropriate environment. This reduces the possibility that the cancellation sound may be taken as unusual sound.

Technique 11 is active noise reduction device 10 according to any one of inventive techniques 1 to 10. Active noise reduction device 10 further includes a storage that stores a correction value used to correct the first frequency to the second frequency. The correction value stored in the storage can be updated by active noise reduction device 10 making an access to an external device.

Active noise reduction device 10 as described above is capable of changing the correction value used to correct the first frequency to the second frequency.

Technique 12 is a mobile object that includes active noise reduction device 10 according to any one of inventive techniques 1 to 11, loudspeaker 52, and microphone 53. The mobile object may, for example, be vehicle 50.

The mobile object as described above is usable as a mobile object that includes active noise reduction device 10 with improved noise reducing performance.

Technique 13 is an active noise reducing method that is executed by a computer such as active noise reduction device 10. The active noise reducing method is the method of reducing noise caused by the revolution of engine 54 provided in vehicle 50 by outputting cancellation sound from loudspeaker 52 in space 51 where loudspeaker 52 and microphone 53 are installed in the interior of vehicle 50. The active noise-reduction method includes the step of generating the first reference signal having the first frequency that corresponds to the engine speed of engine 54, the step of outputting the cancellation signal used to output cancellation sound by applying the filter factor to the first reference signal, the filter factor being successively updated based on the error signal output from microphone 53, and the step of, when the amount of variation in the engine speed of engine 54 has been determined to exceed the predetermined value, generating the second reference signal having the second frequency, which is obtained by correcting the first frequency, and outputting the cancellation signal based on the second reference signal.

The noise reducing method as described above is capable of improving the adaptive speed of adaptive filter 13 by correcting the first frequency to the second frequency to reduce a frequency drift when an abrupt change has been determined to occur in the engine speed of engine 54. Accordingly, the active noise reducing method allows the cancellation sound to follow a change in the frequency of noise. That is, the active noise reducing method is capable of improving noise reducing performance.

Other Embodiments

While the embodiment has been described thus far, the present disclosure is not intended to be limited to the above-described embodiment.

For example, the active noise reduction device according to the above-described embodiment may be mounted on a mobile object other than a vehicle. The mobile object may, for example, be an airplane or a marine vessel. Moreover, the present disclosure may be achieved as a mobile object other than those vehicles.

The configuration of the active noise reduction device according to the above-described embodiment is just one example. For example, the active noise reduction device may include constituent elements such as a digital to analog (D/A) converter, a low-pass filter (LPF), a high-pass filter (HPF), a power amplifier, or an A/D converter.

The processing performed by the active noise reduction device according to the above-described embodiment is just one example. For example, part of the processing described in the above-described embodiment may be achieved by analog signal processing, instead of digital signal processing.

In the above-described embodiment, for example, processing executed by a specific processing unit may be executed by another processing unit. A sequence of a plurality of processing steps may be changed, or a plurality of processing steps may be performed in parallel.

It is to be noted that general or specific aspects of the present disclosure may be achieved as a system, a device, a method, an integrated circuit, a computer program, or a computer-readable recording medium such as a CD-ROM. The present disclosure may also be achieved by any combination of a system, a device, a method, an integrated circuit, a computer program, and a non-transitory computer-readable recording medium.

For example, the present disclosure may be achieved as a noise reducing method that is executed by a computer such as an active noise reduction device (DSP), and the active noise reducing method may be achieved as a program for causing a computer (DSP) to execute the active noise reducing method. The present disclosure may also be achieved as a noise reducing system that includes the active noise reduction device according to the above-described embodiment, a loudspeaker (sound output device), and a microphone (sound collecting device).

A sequence of a plurality of processing steps included in the operations of the active noise reduction device described in the above embodiment is just one example. A sequence of a plurality of processing steps may be changed, or may be executed in parallel.

The present disclosure also includes other variations obtained by making various changes conceivable by a person skilled in the art to the embodiment, and variations obtained by any combination of the constituent elements and functions of the embodiment without departing from the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims are incorporated herein by reference in its entirety: Application No. 2023-081702 filed on May 17, 2023.

INDUSTRIAL APPLICABILITY

The active noise reduction device according to the present disclosure may, for example, be usable as a device for reducing noise in the interior of a vehicle.

The invention claimed is:

1. An active noise reduction device for reducing noise caused by revolution of a power source provided in a mobile object by outputting cancellation sound from a loudspeaker in a space of the mobile object in which the loudspeaker and a microphone are installed, the active noise reduction device comprising:

a reference-signal generator that generates a first reference signal having a first frequency that corresponds to an engine speed of the power source;

an adaptive filter that outputs a cancellation signal used to output the cancellation sound by applying a filter factor to the first reference signal, the filter factor being successively updated based on an error signal output from the microphone; and a frequency controller that, when an amount of variation in the engine speed of the power source has been determined to exceed a predetermined value, causes the reference-signal generator to generate a second reference signal having a second frequency and then to cause the adaptive filter to output a cancellation signal based on the second reference signal, the second frequency being obtained by correcting the first frequency, wherein the frequency controller calculates the amount of variation in the engine speed of the power source to determine whether the amount of variation in the engine speed of the power source exceeds the predetermined value, and wherein, when the amount of variation in the engine speed of the power source has been determined to exceed the predetermined value, the frequency controller increases the amount of correction for correcting the first frequency to the second frequency with increasing amount of variation in the engine speed of the power source.

2. The active noise reduction device according to claim 1, wherein the frequency controller determines that the amount of variation in the engine speed of the power source exceeds the predetermined value during a fixed time period starting from start timing of the power source.

3. The active noise reduction device according to claim 2, wherein the frequency controller increases an amount of correction for correcting the first frequency to the second frequency with increasing amount of variation in the engine speed during the fixed time period.

4. An active noise reduction device for reducing noise caused by revolution of a power source provided in a mobile object by outputting cancellation sound from a loudspeaker in a space of the mobile object in which the loudspeaker and a microphone are installed, the active noise reduction device comprising:

an updater that updates the filter factor in accordance with an update formula that includes a parameter related to a rate of updating;

a reference-signal generator that generates a first reference signal having a first frequency that corresponds to an engine speed of the power source;

an adaptive filter that outputs a cancellation signal used to output the cancellation sound by applying a filter factor to the first reference signal, the filter factor being successively updated based on an error signal output from the microphone; and a frequency controller that, when an amount of variation in the engine speed of the power source has been determined to exceed a predetermined value, causes the reference-signal generator to generate a second reference signal having a second frequency and then to cause the adaptive filter to output a cancellation signal based on the second reference signal, the second frequency being obtained by correcting the first frequency, wherein, when the amount of variation in the engine speed of the power source has been determined to exceed the predetermined value, the frequency controller changes the parameter to make the rate of updating of the filter factor higher than when the amount of variation in the engine speed of the power source has been determined to be less than or equal to the predetermined value.

5. The active noise reduction device according to claim 4, wherein, when the amount of variation in the engine speed of the power source has been determined to exceed the predetermined value, the frequency controller changes the parameter to make the rate of updating of the filter factor higher with increasing amount of variation in the engine speed of the power source.

6. The active noise reduction device according to claim 1, further comprising:

a feedback filter that multiples the cancellation signal output from the adaptive filter by a gain coefficient; and an updater that updates the filter factor in accordance with the error signal and the cancellation signal multiplied by the gain coefficient, wherein, when the amount of variation in the engine speed of the power source has been determined to exceed the predetermined value, the frequency controller changes the gain coefficient to a greater value than when the amount of variation in the engine speed of the power source has been determined to be less than or equal to the predetermined value.

7. The active noise reduction device according to claim 6, wherein, when the amount of variation in the engine speed of the power source has been determined to exceed the predetermined value, the frequency controller changes the gain coefficient to a greater value with increasing amount of variation in the engine speed of the power source.

8. The active noise reduction device according to claim 1, wherein, when the amount of variation in the engine speed of the power source has been determined to exceed the predetermined value and when an environment in the space satisfies a predetermined requirement, the frequency controller causes the reference-signal generator to generate the second reference signal and then to cause the adaptive filter to output a cancellation signal based on the second reference signal.

9. The active noise reduction device according to claim 1, further comprising:

a storage that stores a correction value used to correct the first frequency to the second frequency, wherein the correction value stored in the storage can be updated by the active noise reduction device making an access to an external device.

10. A mobile object comprising:

the active noise reduction device according to claim 1;

the loudspeaker; and the microphone.

11. An active noise reducing method to be executed by a computer, the active noise reducing method being a method for reducing noise caused by revolution of a power source provided in a mobile object in a space by outputting cancellation sound from a loudspeaker in a space of the mobile object in which the loudspeaker and a microphone are installed, the active noise reducing method comprising:

generating a first reference signal having a first frequency that corresponds to an engine speed of the power source;

outputting cancellation signal used to output the cancellation sound by applying a filter factor to the first reference signal, the filter factor being successively updated based on an error signal output from the microphone;

when an amount of variation in the engine speed of the power source has been determined to exceed a predetermined value, generating a second reference signal having a second frequency and outputting a cancellation signal based on the second reference signal, the second frequency being obtained by correcting the first frequency;

calculating the amount of variation in the engine speed of the power source to determine whether the amount of variation in the engine speed of the power source exceeds the predetermined value; and when the amount of variation in the engine speed of the power source has been determined to exceed the predetermined value, increasing an amount of correction for correcting the first frequency to the second frequency with increasing amount of variation in the engine speed of the power source.

* * * * *